| (12) | United States Patent | (10) Patent No.: | US 9,702,379 B2 |
|---|---|---|---|
| | Takahashi et al. | (45) Date of Patent: | Jul. 11, 2017 |

(54) HYBRID WORKING MACHINE

(71) Applicant: Hitachi Construction Machinery Tierra Co., Ltd., Shiga (JP)

(72) Inventors: Kiwamu Takahashi, Koka (JP); Shingo Kishimoto, Koka (JP); Yoshifumi Takebayashi, Koka (JP); Kazushige Mori, Koka (JP); Natsuki Nakamura, Koka (JP)

(73) Assignee: HITACHI CONSTRUCTION MACHINERY TIERRA CO., LTD., Shiga (JP)

( * ) Notice: Subject to any disclaimer, the term of this patent is extended or adjusted under 35 U.S.C. 154(b) by 387 days.

(21) Appl. No.: 14/387,278

(22) PCT Filed: Mar. 19, 2013

(86) PCT No.: PCT/JP2013/057781
§ 371 (c)(1),
(2) Date: Sep. 23, 2014

(87) PCT Pub. No.: WO2013/164928
PCT Pub. Date: Nov. 7, 2013

(65) Prior Publication Data
US 2015/0040553 A1    Feb. 12, 2015

(30) Foreign Application Priority Data

May 1, 2012  (JP) ................................. 2012-104987

(51) Int. Cl.
*F15B 11/16*  (2006.01)
*E02F 3/32*  (2006.01)
(Continued)

(52) U.S. Cl.
CPC ................ *F15B 11/16* (2013.01); *B60K 6/48* (2013.01); *B60K 6/485* (2013.01); *E02F 3/325* (2013.01);
(Continued)

(58) Field of Classification Search
CPC ............ F15B 2211/253; F15B 2211/26; F15B 2211/275; F15B 11/165
See application file for complete search history.

(56) References Cited

U.S. PATENT DOCUMENTS 6,105,367 A    8/2000  Tsuruga et al.
6,170,261 B1 *  1/2001  Ishizaki ................ E02F 9/2232
                                                                60/421
(Continued)

FOREIGN PATENT DOCUMENTS

DE    19709475 A1 *  9/1998  ............... B66B 1/24
JP    10-196604 A    7/1998
(Continued)

OTHER PUBLICATIONS

International Preliminary Report on Patentability received in International Application No. PCT/JP2013/057781 dated Nov. 13, 2014.

*Primary Examiner* — Eric Keasel
*Assistant Examiner* — Matthew Wiblin
(74) *Attorney, Agent, or Firm* — Mattingly & Malur, PC

(57) ABSTRACT

Pressure sensors are provided to detect the delivery pressure of a hydraulic pump, the output pressure of an engine revolution speed detecting valve, and the output pressure of a differential pressure reducing valve generating the differential pressure between the delivery pressure of the hydraulic pump and a maximum load pressure. A vehicle controller calculates virtually the displacement of the hydraulic pump by use of the detected pressures and an equation of motion about a swash plate of the hydraulic pump, calculates the (Continued)

power need of the hydraulic pump and the output of the engine using these values, and switches a motor between powering and generation control in accordance with the result of a comparison between the pump power need and the engine output. In this manner, the displacement of the hydraulic pump without using sensors to detect the tilting angle of the swash plate of the hydraulic pump.

3 Claims, 8 Drawing Sheets

(51) Int. Cl.
E02F 9/20 (2006.01)
E02F 9/22 (2006.01)
B60K 6/485 (2007.10)
F15B 21/00 (2006.01)
B60K 6/48 (2007.10)

(52) U.S. Cl.
CPC .......... *E02F 9/2075* (2013.01); *E02F 9/2232* (2013.01); *E02F 9/2285* (2013.01); *E02F 9/2296* (2013.01); *F15B 11/165* (2013.01); *F15B 21/001* (2013.01); *B60W 2300/17* (2013.01); *F15B 2211/20515* (2013.01); *F15B 2211/20523* (2013.01); *F15B 2211/20553* (2013.01); *F15B 2211/25* (2013.01); *F15B 2211/253* (2013.01); *F15B 2211/26* (2013.01); *F15B 2211/275* (2013.01); *F15B 2211/6058* (2013.01); *F15B 2211/6309* (2013.01); *F15B 2211/6313* (2013.01); *F15B 2211/6316* (2013.01); *F15B 2211/6355* (2013.01); *F15B 2211/6651* (2013.01); *F15B 2211/6655* (2013.01); *Y02T 10/6221* (2013.01); *Y02T 10/6226* (2013.01)

(56) References Cited

U.S. PATENT DOCUMENTS

| 9,013,050 | B2* | 4/2015 | Yamashita | H02P 9/00 290/40 R |
| 9,032,726 | B2* | 5/2015 | Sora | E02F 9/2235 60/431 |
| 2007/0227135 | A1* | 10/2007 | Khalil | E02F 9/2217 60/420 |
| 2011/0173964 | A1* | 7/2011 | Takahashi | E02F 9/2225 60/451 |
| 2012/0089288 | A1* | 4/2012 | Kawashima | B60K 6/485 701/22 |
| 2013/0287601 | A1* | 10/2013 | Mori | E02F 9/2225 417/364 |

FOREIGN PATENT DOCUMENTS

| JP | 2004-011256 A | 1/2004 |
| JP | 3833573 B2 | 7/2006 |
| JP | 2009-287744 A | 12/2009 |

* cited by examiner

HYBRID WORKING MACHINE

TECHNICAL FIELD

The present invention relates to a hybrid working machine. More particularly, the invention relates to a hybrid working machine that can be adapted advantageously to a small-size hydraulic excavator.

BACKGROUND ART

Patent Literature 1 (Japanese Patent No. 3833573) describes related art of the hybrid working machine. Patent Literature 1 discloses "a hybrid construction machine capable of driving a hydraulic pump by use of an engine and a motor-generator, the hydraulic construction machine including: pump output calculation means which calculates the output of the hydraulic pump; revolution speed setting means which sets a revolution speed of the engine; threshold value setting means which sets a threshold value at which the motor-generator is switched between motor capability and generator capability, the threshold value being set as a function on the engine revolution speed set by the revolution speed setting means; comparison means which compares the threshold value set by the threshold value setting means, with the hydraulic pump output calculated by the pump output calculation means; and switching control means which controls switching of the capabilities of the motor-generator in accordance with a result of the comparison performed by the comparison means."

PRIOR ART LITERATURE

Patent Literature

[Patent Literature 1]
Japanese Patent No. 3833573

SUMMARY OF THE INVENTION

Problems to be Solved by the Invention

However, the related art described by Patent Literature 1 has the following problems:

To calculate the power need of the hydraulic pump requires knowing the delivery pressure and the displacement of the hydraulic pump. Patent Literature 1 shows that the displacement of the hydraulic pump is made known by the use of a "swash plate angle detector" that detects the tilting angle of a swash plate of the hydraulic pump.

However, with small-size hydraulic excavators such as mini-excavators, it is difficult to install the swash plate angle detector in the hydraulic pump often because of insufficient installation space or of the small pump size. In these cases, the displacement of the hydraulic pump cannot be calculated.

To calculate the power need of the hydraulic pump also requires knowing the engine revolution speed. However, on some small-size hydraulic excavators such as mini-excavators, their engines are not equipped with sensors for detecting the revolution speed due to size restrictions.

These are the problems encountered when a hybrid system is mounted on working machines such as small-size hydraulic excavators exemplified mini-excavators.

An object of the present invention is to provide a hybrid working machine capable of estimating the displacement of a hydraulic pump without sensors that detect the tilting angle of the swash plate of the hydraulic pump so that the working machine may be furnished easily with a hybrid system even if the machine is configured to be small-sized, often with insufficient installation space.

Another object of the present invention is to provide a hybrid working machine capable of calculating the power need of a hydraulic pump without sensors that detect the tilting angle of the swash plate of the hydraulic pump and the revolution speed of an engine so that the working machine may be furnished easily with a hybrid system even if configured to be a small-size hydraulic excavator such as a mini-excavator with its engine not furnished with sensors for detecting the revolution speed due to size restrictions.

Means for Solving the Problems

In achieving the objects above and according to the present invention, there is provided a hybrid working machine comprising: an engine; a hydraulic pump driven by the engine; a motor which drives the hydraulic pump in combination with the engine; a plurality of actuators driven by hydraulic fluid delivered by the hydraulic pump; a pump control system including a torque control unit which performs control to reduce a displacement of the hydraulic pump when a delivery pressure of the hydraulic pump is being raised, so that absorption torque of the hydraulic pump will not exceed predetermined maximum torque, and a load sensing control unit which controls the displacement of the hydraulic pump in such a manner that the delivery pressure of the hydraulic pump becomes higher than a maximum load pressure of the plurality of actuators just by a target differential pressure; a plurality of pressure sensors including a first pressure sensor which detects the delivery pressure of the hydraulic pump, and a second pressure sensor which detects a pressure related to the differential pressure between the delivery pressure of the hydraulic pump and the maximum load pressure; and a control system which calculates a power need of the hydraulic pump and an output of the engine on the basis of the pressures detected with the plurality of pressure sensors, and performs switching between powering control and generation control of the motor in accordance with a result of a comparison between the power need of the hydraulic pump and the output of the engine. The control system calculates virtually the displacement of the hydraulic pump by use of the pressures detected with the first and the second pressure sensors and an equation of motion about a displacement volume varying member of the hydraulic pump.

When the control system calculates virtually the displacement of the hydraulic pump by use of the pressures detected with the first and the second sensors and through the use of the equation of motion about the displacement volume varying member of the hydraulic pump as above, it is possible to estimate the displacement of the hydraulic pump without sensors to detect the tilting angle of the swash plate of the hydraulic pump. Thus there is no need to install a tilting angle sensor. As a result, small-size hydraulic excavators such as mini-excavators often with insufficient installation space can still be equipped with a hybrid system.

Also in achieving the objects above and according to the present invention, the above-mentioned hybrid working machine may further include: a pilot pump driven by the engine; a pilot hydraulic power source connected to the pilot pump to generate a pilot primary pressure based on delivery fluid from the pilot pump; and an engine revolution speed detection valve interposed between the pilot pump and the pilot hydraulic power source, the engine revolution speed detection valve further generating as an absolute pressure a hydraulic signal dependent on a revolution speed of the engine on the basis of the delivery fluid from the pilot pump, the engine revolution speed detection valve further outputting the hydraulic signal. The hydraulic signal from the engine revolution speed detection valve is led to the load sensing control unit of the pump control system as a target differential pressure for load sensing control. The plurality of pressure sensors further include a third pressure sensor which detects the hydraulic signal output from the engine revolution speed detection valve. The control system calculates the revolution speed of the engine by use of the pressure of the hydraulic signal detected with the third pressure sensor, calculates the output of the engine by use of the engine revolution speed, and calculates virtually the displacement of the hydraulic pump by use of the pressures detected individually by the first, the second, and the third pressure sensors and through the use of the equation of motion about the displacement volume varying member of the hydraulic pump.

When the engine revolution speed is calculated from the pressure of the hydraulic signal detected with the third pressure sensor and output by the engine revolution speed detection valve as above, it is possible to calculate the power need of the hydraulic pump without sensors that detect the tilting angle of the swash plate of the hydraulic pump and the engine revolution speed. Thus small-size hydraulic excavators such as mini-excavators with their engines not furnished with sensors for detecting the engine revolution speed due to size restrictions can still be provided easily with a hybrid system.

Preferably, the above-mentioned hybrid working machine may further include a differential pressure reducing valve which generates as an absolute pressure a differential pressure between the delivery pressure of the hydraulic pump and the maximum load pressure, the differential pressure reducing valve further outputting the differential pressure. The second pressure sensor is a pressure sensor for detecting the differential pressure output from the differential pressure reducing valve. The plurality of pressure sensors make up three pressure sensors composed of the first, the second, and the third pressure sensors.

When configured as above, small-size hydraulic excavators such as mini-excavators with their engines not equipped with sensors for detecting the revolution speed due to often-insufficient installation space and under size restrictions can still be provided easily with a hybrid system.

Effect of the Invention

According to the present invention, it is possible to estimate the displacement of the hydraulic pump without sensors for detecting the tilting angle of the swash plate of the hydraulic pump so that a small-size working machine often with insufficient installation space can still be furnished easily with a hybrid system.

Also according to the present invention, it is possible to calculate the power need of the hydraulic pump without sensors that detect the tilting angle of the swash plate of the hydraulic pump and the revolution speed of the engine so that small-size hydraulic excavators such as mini-excavators with their engines not equipped with sensors for detecting the revolution speed under size restrictions can still be furnished easily with a hybrid system.

MODE FOR CARRYING OUT THE INVENTION

Some embodiments of the present invention are explained below by use of the accompanying drawings.

First Embodiment

Configuration

Figure 1:
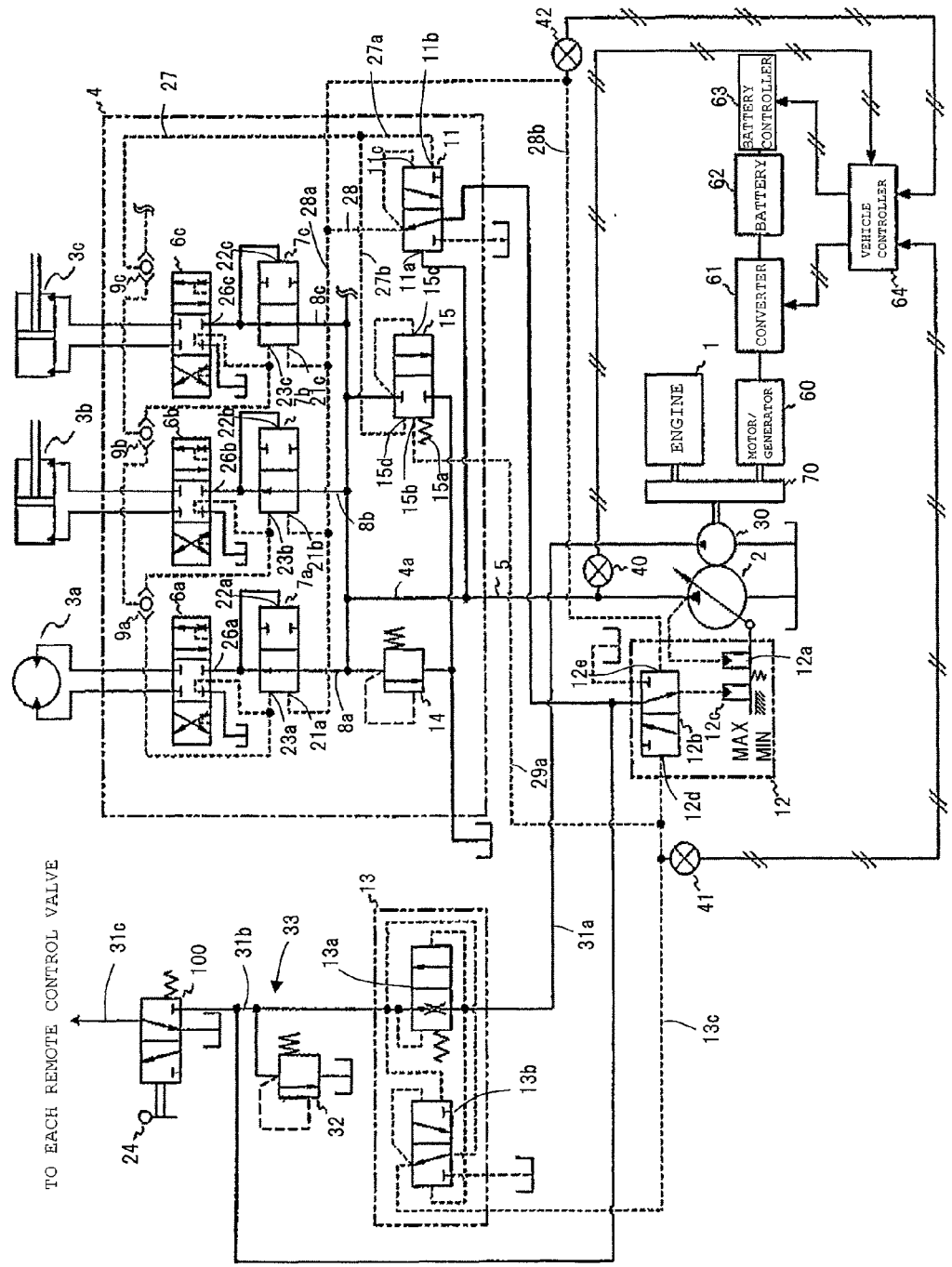
FIG. 1 is a diagram showing a configuration of a hydraulic drive system (hybrid system) of a hybrid working machine as one embodiment of the present invention.

FIG. 1 is a diagram showing a configuration of a hydraulic drive system (hybrid system) of a hybrid working machine as one embodiment of the present invention. This embodiment is implemented by applying the present invention to a front swing type hydraulic excavator.

In FIG. 1, the hydraulic drive system (hybrid system) as the first embodiment of the present invention includes: an engine 1; a variable displacement hydraulic pump 2 as the main pump driven by the engine 1; a fixed displacement pilot pump 30 also driven by the engine 1; a motor-generator (simply called the motor hereunder) 60 connected to the hydraulic pump 2 in parallel with the engine 1 via a power distributor 70, the motor 60 driving the hydraulic pump 2 and the pilot pump 30 in auxiliary fashion or functioning as a generator when driven by the engine 1; multiple actuators 3a, 3b, 3c, . . . driven by hydraulic fluid delivered by the hydraulic pump 2; a control valve 4 interposed between the hydraulic pump 2 and the multiple actuators 3a, 3b, 3c, . . . ; a pump control system 12 that controls the tilting angle of the swash plate (capacity or displacement volume) of the hydraulic pump 2; an engine revolution speed detection valve 13 connected to a hydraulic fluid supply line 31a through which delivery fluid from the pilot pump 30 is supplied; a pilot relief valve 32 connected to a pilot hydraulic line 31b downstream of the engine revolution speed detection valve 13 and constituting a pilot hydraulic power source 33; a gate lock valve 100 connected as a safety valve to the pilot hydraulic line 31b and operated with a gate lock lever 24 to let a downstream pilot hydraulic line 31c connect selectively with either the pilot hydraulic line 31b or a tank T; and control lever devices 122 and 123 (see FIG. 4) which are connected to the pilot hydraulic line 31c and generate command pilot pressures (command signals) to operate the actuators 3a, 3b, 3c, etc.

The control valve 4 has a second hydraulic fluid supply line 4a (internal passage) connected to a first hydraulic fluid supply line 5 (conduit) through which the delivery fluid of the hydraulic pump 2 is supplied; multiple closed center flow control valves 6a, 6b, 6c, . . . connected respectively to hydraulic lines 8a, 8b, 8c, . . . branched from the second hydraulic fluid supply line 4a to control the flow rate and the direction of the hydraulic fluid supplied from the hydraulic pump 2 to the actuators 3a, 3b, 3c, . . . ; pressure compensating valves 7a, 7b, 7c, . . . connected to the hydraulic lines 8a, 8b, 8c, . . . upstream of the flow control valves 6a, 6b, 6c, . . . to control the differential pressures across the flow control valves 6a, 6b, 6c, . . . at meter-in throttles; shuttle valves 9a, 9b, 9c, which select the highest of load pressures (maximum load pressure) of the actuators 3a, 3b, 3c, . . . , before outputting the selected pressure to a signal hydraulic line 27; a differential pressure reducing valve 11 that outputs to a signal hydraulic line 28 the differential pressure between the delivery pressure of the hydraulic pump 2 and the maximum load pressure as an absolute pressure; a main relief valve 14 connected to the second hydraulic fluid supply line 4a to act so that the pressure of the second hydraulic fluid supply line 4a (delivery pressure of the hydraulic pump 2) will not exceed a set pressure; and an unloading valve 15 connected to the second hydraulic fluid supply line 4a and opened when the delivery pressure of the hydraulic pump 2 becomes higher than the maximum load pressure plus an unloading pressure (set pressure of a spring 15a and a pressure receiving portion 15b) so as to let the delivery fluid of the hydraulic pump 2 return to the tank T, thereby limiting the rise in the delivery pressure of the hydraulic pump 2.

For example, the actuators 3a, 3b and 3c are a swing motor, a boom cylinder, and an arm cylinder of the hydraulic excavator. The flow control valves 6a, 6b and 6c are for use in the swing operation, boom operation, and arm operation, respectively. For simplicity of illustration, nothing is shown of other actuators such as a bucket cylinder, a boom swing cylinder and a traveling motor and of the flow control valves associated with these actuators.

The flow control valves 6a, 6b, 6c, . . . are equipped with load ports 26a, 26b, 26c, . . . respectively. When the flow control valves 6a, 6b, 6c, . . . are in neutral position, the load ports 26, 26b, 26c, . . . are connected to the tank T to output the tank pressure as a load pressure. When the flow control valves 6a, 6b, 6c, . . . are switched from neutral position to either the right or the left operating position shown in the drawing, the valves are connected to their respective actuators 3a, 3b, 3c, . . . to output the load pressures of the actuators 3a, 3b, 3c, etc.

The shuttle valves 9a, 9b, 9c, . . . are connected in tournament fashion to constitute, together with the load ports 26a, 26b, 26c, . . . and the signal hydraulic line 27, a maximum load pressure detection circuit. The shuttle valve 9c is a last-stage shuttle valve whose output pressure is output as the maximum load pressure to the signal hydraulic line 27. The maximum load pressure output through the signal hydraulic line 27 is led to the differential pressure reducing valve 11 and unloading valve 15 via signal hydraulic lines 27a and 27b.

The pressure compensating valves 7a, 7b, 7c, . . . has pressure receiving portions 21a, 21b, 21c, . . . to which the output pressure of the differential pressure reducing valve 11 is led via a hydraulic line 28a and which open when operated, and pressure receiving portions 22a, 23a, 22b, 23b, 22c, 23c, . . . which detect the differential pressures across the flow control valves 6a, 6b, 6c, . . . at meter-in throttles. The pressure compensating valves 7a, 7b, 7c, . . . perform control so that the differential pressures across the flow control valves 6a, 6b, 6c, . . . at the meter-in throttles will become the same as the output pressure of the different pressure reducing valve 11 (i.e., differential pressure between the delivery pressure of the hydraulic pump 2 and the maximum load pressure of the actuators 3a, 3b, 3c, . . . ).

The differential pressure reducing valve 11 is a valve that generates as an absolute pressure the differential pressure between the delivery pressure of the hydraulic pump 2 and the maximum load pressure, with the pressure of the pilot hydraulic line 31b used as the source pressure. The differential pressure reducing valve 11 has a pressure receiving portion 11a to which the delivery pressure of the hydraulic pump 2 is led, a pressure receiving portion 11b to which the maximum load pressure is led, and a pressure receiving portion 11c to which the own output pressure is led.

The unloading valve 15 has the spring 15a and pressure receiving portion 15b closed when operated to set the unloading pressure (cracking pressure) Pun of the unloading valve 15, a pressure receiving portion 15c to which the pressure of the second hydraulic fluid supply line 4a (delivery pressure of the hydraulic pump 2) is led and which opens when operated, and a pressure receiving portion 15d to which the maximum load pressure is led via the signal hydraulic line 27a and which closes when operated. When the pressure of the second hydraulic fluid supply line 4a becomes higher than the maximum load pressure plus the unloading pressure Pun set by the spring 15a and pressure receiving portion 15b, the unloading valve 15 is opened to let the hydraulic fluid in the second hydraulic fluid supply line 4a return to the tank T, thereby limiting the rise in the pressure of the second hydraulic fluid supply line 4a (delivery pressure of the hydraulic pump 2). Generally, the unloading pressure Pun set by the spring 15a and pressure receiving portion 15b of the unloading valve 15 is set to be approximately equal to or a little higher than a target differential pressure (to be discussed later) for load sensing control established by the output pressure of the engine revolution speed detection valve 13 in effect when the engine 1 is at a rated maximum revolution speed. In this embodiment, the output pressure of the engine revolution speed detection valve 13 is led to the pressure receiving portion 15b via a hydraulic line 29a. This arrangement sets the unloading pressure Pun to a pressure formed by the set pressure of the spring 15a plus the output pressure of the engine revolution speed detection valve 13. As a result of this, the unloading pressure Pun is set to be higher by the setting of the spring 15a than the target differential pressure for load sensing control. Also, because the output pressure of the engine revolution speed detection valve 13 is led to the pressure receiving portion 15b in setting the unloading pressure Pun, the cold startability of the engine is improved.

The engine revolution speed detection valve 13 is made up of a variable throttle valve 13a whose throttle amount is varied in keeping with the delivery flow rate of the pilot pump 30, and a differential pressure reducing valve 13b that outputs the differential pressure across the variable throttle valve 13a as an absolute pressure Pgr. Because the delivery flow rate of the pilot pump 30 varies depending on the engine revolution speed, the differential pressure across the variable throttle valve 13a also varies with the engine revolution speed. As a result, the absolute pressure Pgr output by the differential pressure reducing valve 13b also varies depending on the engine revolution speed. The absolute pressure Pgr is led to the pump control system 12 via a hydraulic line 13c, so that the pump control system 12 controls the tilting angle of the swash plate of the hydraulic pump 2 (capacity or displacement volume) by use of the absolute pressure Pgr as the target differential pressure for load sensing control. With this arrangement, a saturation phenomenon exhibited in keeping with the engine revolution speed is improved, and fine operability is made available when the engine revolution speed is set to be low. This point is detailed in JP-10-196604-A.

The pump control system 12 has a torque control piston 12a (torque control unit), and an LS control valve 12b as well as an LS control piston 12c (load sensing control unit).

The torque control piston 12a reduces the tilting angle of the swash plate of the hydraulic pump 2 as the delivery pressure of the hydraulic pump 2 is being raised, so that the absorption torque (input torque) of the hydraulic pump 2 will not exceed predetermined maximum torque. This provides control such that the absorption torque of the hydraulic pump 2 will not exceed the limit torque of the engine 1, thereby limiting the horsepower consumption of the hydraulic pump 2 to prevent the engine 1 from stopping (stalling) due to overload.

The LS control valve 12b has opposed pressure receiving portions 12d and 12e. The absolute pressure Pgr output by the differential pressure reducing valve 13b of the engine revolution speed detection valve 13 (called the output pressure Pgr of the differential pressure reducing valve 13b hereunder) is led to the pressure receiving portion 12d via the hydraulic line 13c as the target differential pressure for load sensing control (target LS differential pressure). The output pressure of the differential pressure reducing valve 11 (absolute differential pressure between the delivery pressure of the hydraulic pump 2 and the maximum load pressure; called the output pressure Pls hereunder) is led to the pressure receiving portion 12e via a hydraulic line 28b. When the output pressure Pls of the differential pressure reducing valve 11 becomes higher than the output pressure Pgr of the differential pressure reducing valve 13b, the LS control valve 12b leads the pressure of the pilot hydraulic line 31b to the LS control piston 12c so as to reduce the tilting angle of the swash plate of the hydraulic pump 2. When the output pressure Pls of the differential pressure reducing valve 11 becomes lower than the output pressure Pgr of the differential pressure reducing valve 13b, the LS control valve 12b connects the LS control piston 12c to the tank T to increase the tilting angle of the swash plate of the hydraulic pump 2. This provides control on the tilting angle of the swash plate of the hydraulic pump 2 in such a manner that the delivery pressure of the hydraulic pump 2 becomes higher than the maximum load pressure just by the output pressure (target differential pressure) of the differential pressure reducing valve 13b. Thus the LS control valve 12b and LS control piston 12c carry out load sensing control so that the delivery pressure of the hydraulic pump 2 becomes higher just by the target differential pressure than the maximum load pressure of the multiple actuators 3a, 3b, 3c, etc.

Also, the hydraulic drive system of this embodiment includes: a converter 61 that switches the motor-generator 60 between motor and generator functions; a battery 62 that supplies power to the motor-generator 60 via the converter 61 or stores power generated by the motor-generator 60; a battery controller 63 that controls status of the battery 62; a pressure sensor 40 connected to the first hydraulic fluid supply line 5 to detect the delivery pressure of the hydraulic pump 2; a pressure sensor 41 connected to the hydraulic line 13c to detect the output pressure Pgr of the engine revolution speed detection valve 13; a pressure sensor 42 that detects the output pressure Pls of the differential pressure reducing valve 11; and a vehicle controller 64.

The vehicle controller 64 inputs detected pressures from the pressure sensors 40, 41 and 42 to estimate the power necessary for the hydraulic pump 2 and, through comparison with the output of the engine 1, determines whether the motor-generator 60 is to be used as a motor or as a generator before outputting a relevant control signal to the converter 61.

Figure 4:
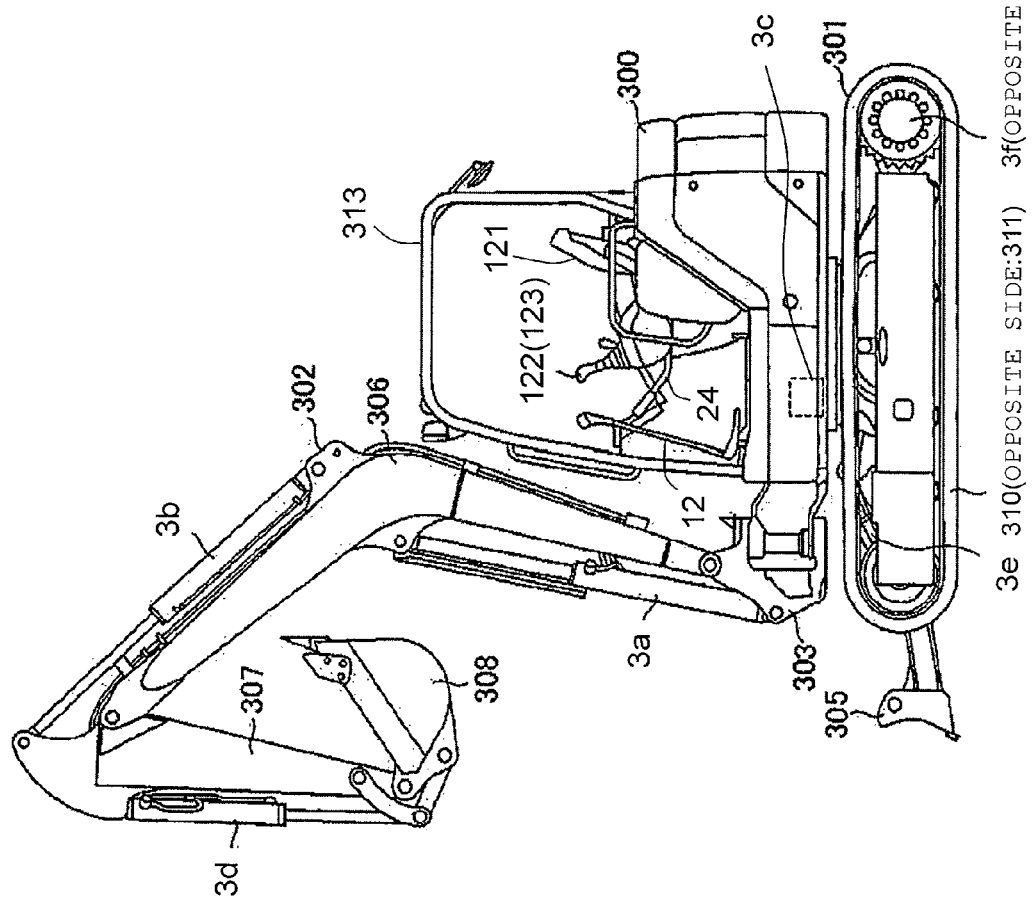
FIG. 4 is an external view of a mini-excavator (small-size hydraulic excavator) on which the hydraulic drive system of the present invention is mounted.

FIG. 4 is an external view of a mini-excavator (small-size hydraulic excavator) on which the hydraulic drive system of the present invention is mounted.

In FIG. 4, the mini-excavator, which is a well-known working machine, has an upper swing structure 300, a lower track structure 301, and a swing type front work implement 302. The front work implement 302 is made up of a boom 306, an arm 307, and a bucket 308. The upper swing structure 300 can swing relative to the lower track structure 301 by rotation of a swing motor 3c shown in FIG. 1. A swing post 303 is attached to the front of the upper swing structure 300. The front work implement 302 is attached to the swing post 303 in a vertically movable manner. The swing post 303 may be rotated horizontally relative to the upper swing structure 300 by contraction and extension of a swing cylinder, not shown. The boom 306, arm 307, and bucket 308 of the front work implement 302 can be rotated vertically by contraction and extension of a boom cylinder 3a, an arm cylinder 3b, and a bucket cylinder 3c, respectively. A blade 305 movable vertically by contraction and extension of a blade cylinder 3e is attached to a central frame of the lower track structure 301. The lower track structure 301 travels with traveling motors 3f and 3g driving right and left crawler tracks 310 and 311. In FIG. 1, only the boom cylinder 3a, arm cylinder 3b, and swing motor 3c are shown; nothing is shown of the bucket cylinder 3d, blade cylinder 34, right and left traveling motors 3f and 3g, and their circuit elements.

A cabin (operating room) 313 is mounted on the upper swing structure 300. Inside the cabin 313 are a driver's seat 121, front/swing control lever devices 122 and 123 (only the right-side device is shown in FIG. 4), a traveling control lever device 124, and a gate lock lever 24.

Figure 2:
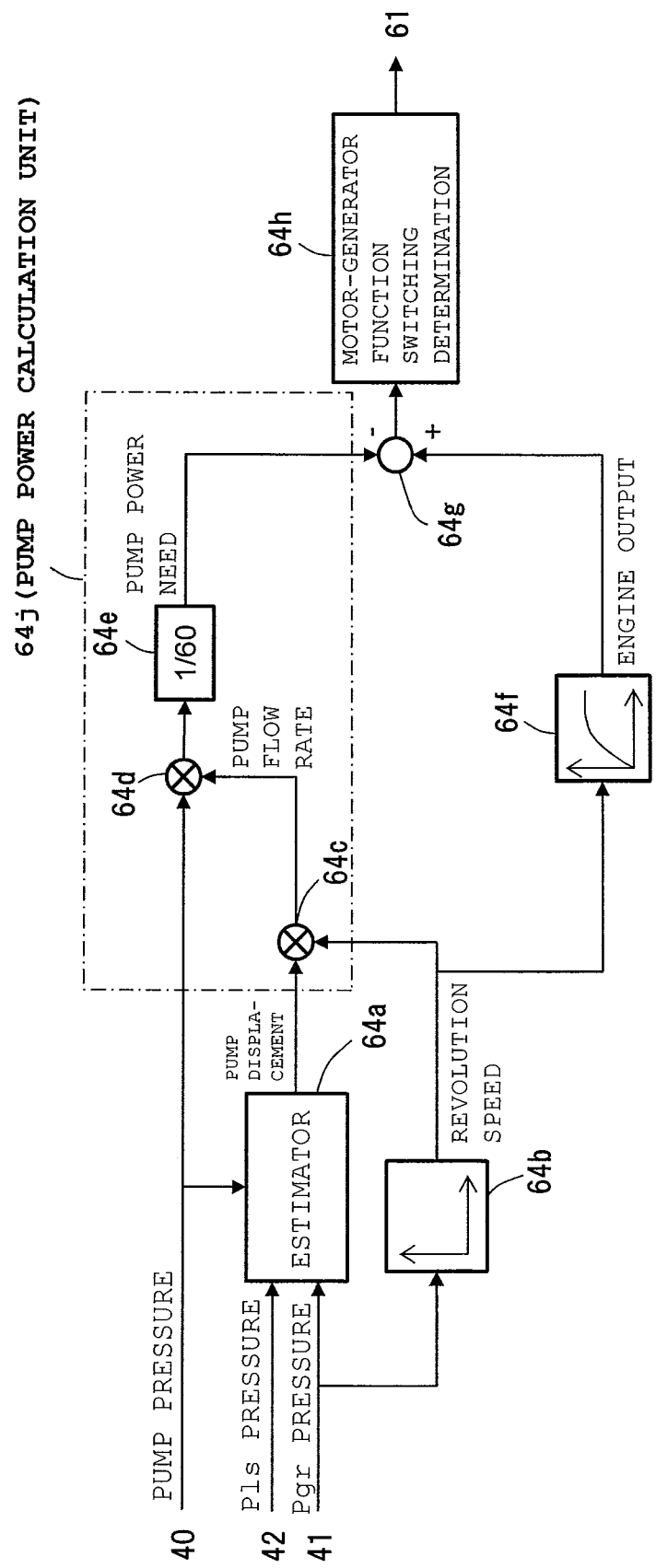
FIG. 2 is a functional block diagram showing details of processing performed by a vehicle controller.

FIG. 2 is a functional block diagram showing details of processing performed by the vehicle controller 64.

The vehicle controller 64 has the functions of an estimator (observer) 64a, revolution speed table data 64b, multipliers 64c and 64d, a converter 64e, engine output table data 64f, a subtractor 64g, and a computing unit 64h.

The estimator 64a stores an equation of motion about the swash plate 2a of the hydraulic pump 2 as a program, and calculates virtually the displacement of the hydraulic pump 2 (called the pump displacement hereunder where appropriate) by use of the delivery pressure of the hydraulic pump 2, which is detected with the pressure sensor 40, the output pressure Pgr of the engine revolution speed detection valve 13, which is detected with the pressure sensor 41, the output pressure Pls of the differential pressure reducing valve 11, which is detected with the pressure sensor 42, and the equation of motion. The equation of motion about the swash plate 2a covers the movements attributed to horsepower control of the hydraulic pump 2 and to flow rate control under load sensing control (to be discussed later).

The revolution speed table data 64b inputs the output pressure Pgr of the engine revolution speed detection valve 13, which is detected with the pressure sensor 41, and calculates the revolution speed of the hydraulic pump 2 (called the pump revolution speed hereunder where appropriate) by referencing the output pressure Pgr of the engine revolution speed detection valve 13 against previously stored relations between the absolute pressure Pgr and the engine revolution speed. Because the engine revolution speed detection valve 13 outputs the absolute pressure Pgr in accordance with the delivery flow rate of the pilot pump 30, it is possible conversely to calculate the delivery flow rate of the pilot pump 30 (i.e., revolution speed of the pilot pump 30) from the absolute pressure Pgr, thereby obtaining the pump revolution speed.

The multipliers 64c and 64d and the converter 64e make up a pump power calculation unit 64j that calculates the power need of the hydraulic pump 2 by use of the pump displacement calculated virtually with the estimator 64a and the delivery pressure of the hydraulic pump 2, which is detected with the pressure sensor 40. The multiplier 64c multiplies the obtained pump displacement by the pump revolution speed to calculate the flow rate delivered by the hydraulic pump 2 (called the pump flow rate hereunder where appropriate). The multiplier 64d multiplies the pump flow rate by the delivery pressure of the hydraulic pump 2 (called the pump pressure hereunder where appropriate), which is detected with the pressure sensor 40 to calculate the power need of the hydraulic pump 2 (called the pump power need hereunder).

The engine output table data 64f inputs the pump revolution speed calculated by the revolution speed table data 64b, and calculates the output of the engine 1 (called the engine output hereunder where appropriate) by referencing the pump revolution speed against previously stored output horsepower characteristics of the engine 1. If the revolution speed of the hydraulic pump 2 is different here from the revolution speed of the engine 1 due to the speed reduction ratio of the power distributor 70, the difference between the revolution speeds is compensated with the converter 64e.

With this embodiment, the pump power need calculated with the multipliers 64c and 64d (pump power calculation unit 64j) and the engine output calculated with the engine output table data 64f are horsepower values. Alternatively, these values may be torque values. In this case, the multiplier 64c is not needed, and the engine output table data 64f need only store the output torque characteristics of the engine 1.

The subtractor 64g subtracts the pump power need from the calculated engine output. The computing unit 64h determines how to switch the motor-generator functionally on the basis of the result of "engine output" minus "pump power need" as calculated with the subtractor 64g. Specifically, if "engine output" minus "pump power need" minus Pm is equal to or larger than (≥) 0, that means the engine output has some margin to spare. In that case, the computing unit 64h outputs the control signal to the converter 61 so that the motor-generator 60 is to be used as a generator. Conversely, if "engine output" minus "pump power need" minus Pm is less than (<) 0, that means the engine output has no margin to spare. In this case, the computing unit 64h outputs the control signal to the converter 61 so that the motor-generator 60 is to be used as a motor.

In this context, Pm stands for a margin of "pump power need" with regard to "engine output," the margin being set to an appropriate value in advance.

The details of the estimator 64a are explained below by use of FIGS. 3A through 3D.

Figure 3A:
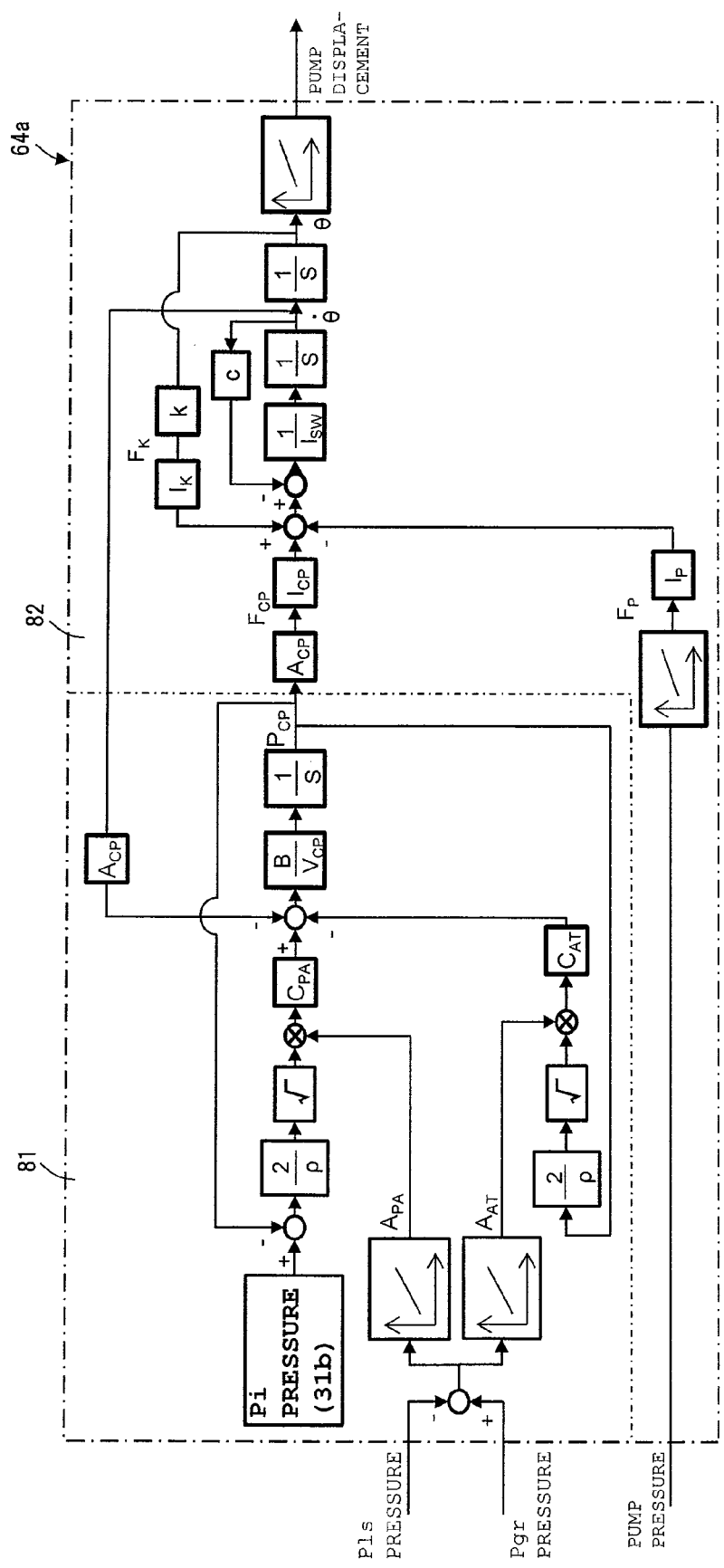
FIG. 3A is a block diagram showing details of an estimator.
Figure 3B:
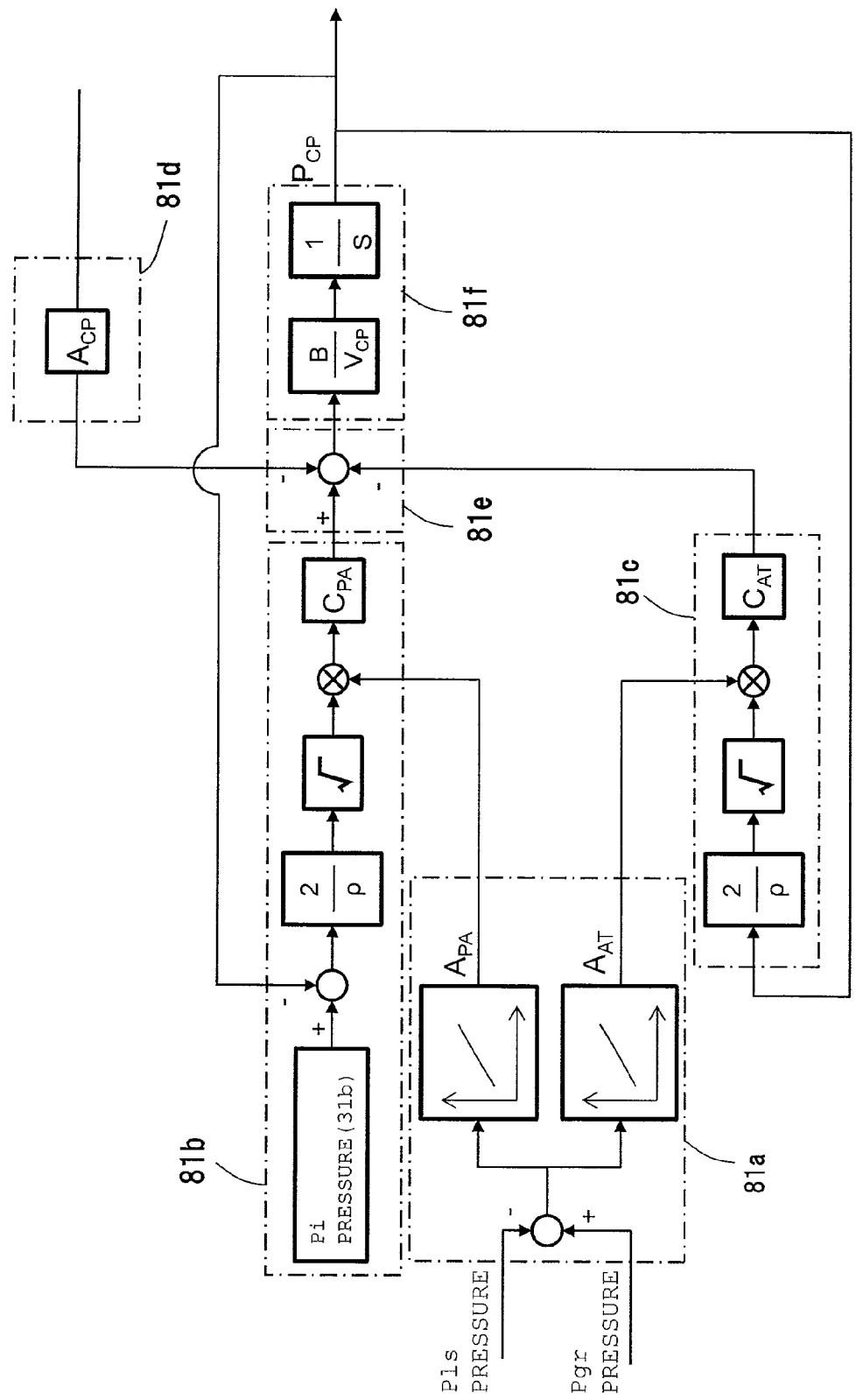
FIG. 3B is a partially magnified view of the estimator shown in FIG. 3A.
Figure 3C:
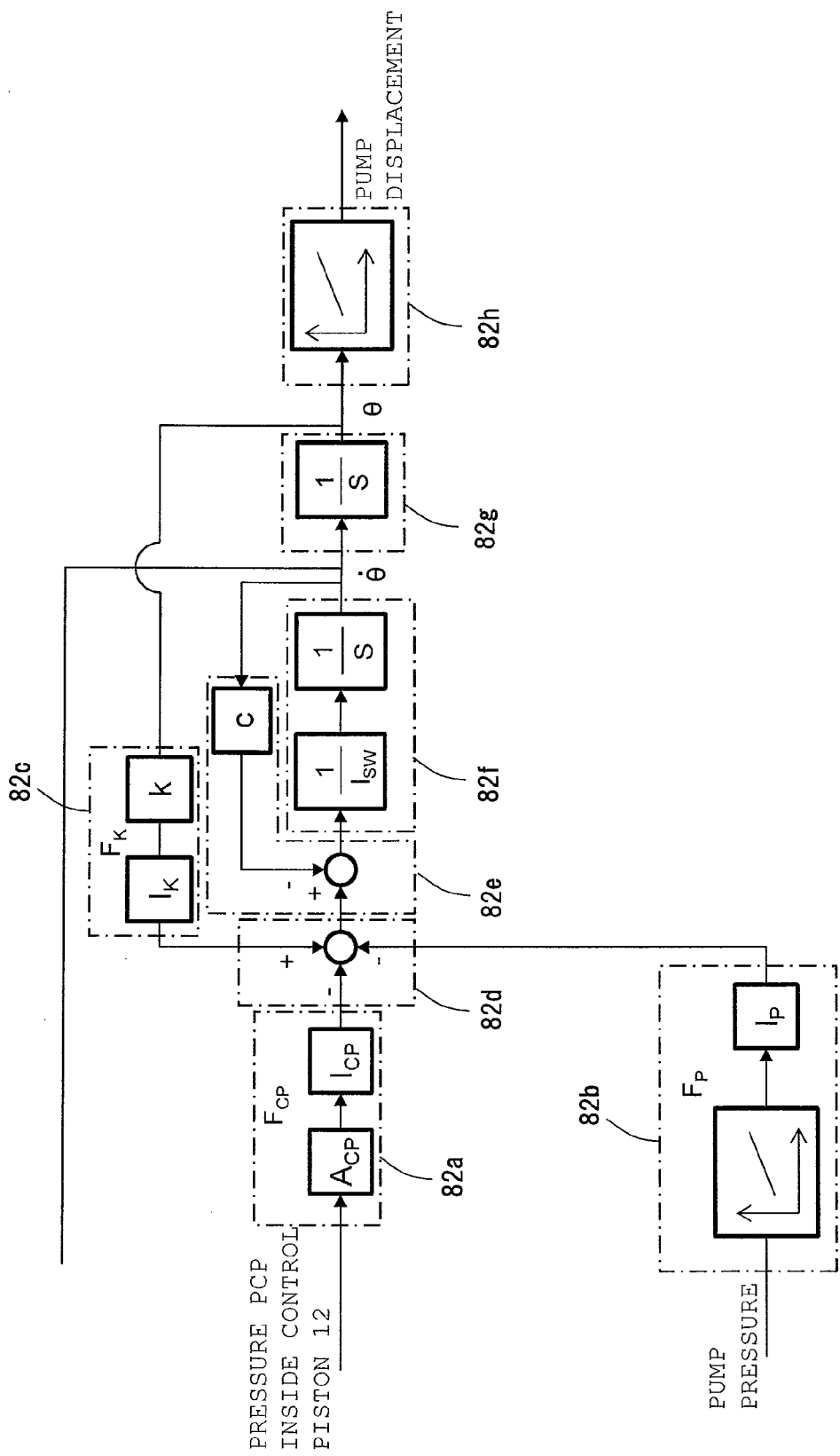
FIG. 3C is another partially magnified view of the estimator shown in FIG. 3A.

FIG. 3A is a block diagram showing some details of the estimator 64a. FIGS. 3B and 3C are each a partially magnified view of a part of FIG. 3A.

The estimator 64a is made up of a calculation unit 81 which inputs the output pressure Pgr of the engine revolution speed detection valve 13, which is detected with the pressure sensor 41 and the output pressure Pls of the differential pressure reducing valve 11, which is detected with the pressure sensor 42, and calculates the pressure inside the LS control piston 12c on the basis of a hydraulic model; and a calculation unit 82 which inputs the pump pressure detected with the pressure sensor 40 and, by use of the pressure inside the LS control piston 12c obtained with the calculation unit 81, calculates the pump displacement by establishing the equation of motion about the swash plate 2a on the basis of a typical dynamic model involving the sum of moments working on the rotating center of the swash plate 2a. FIG. 3B is a magnified view of the calculation unit 81, and FIG. 3C is a magnified view of the calculation unit 82.

Figure 3D:
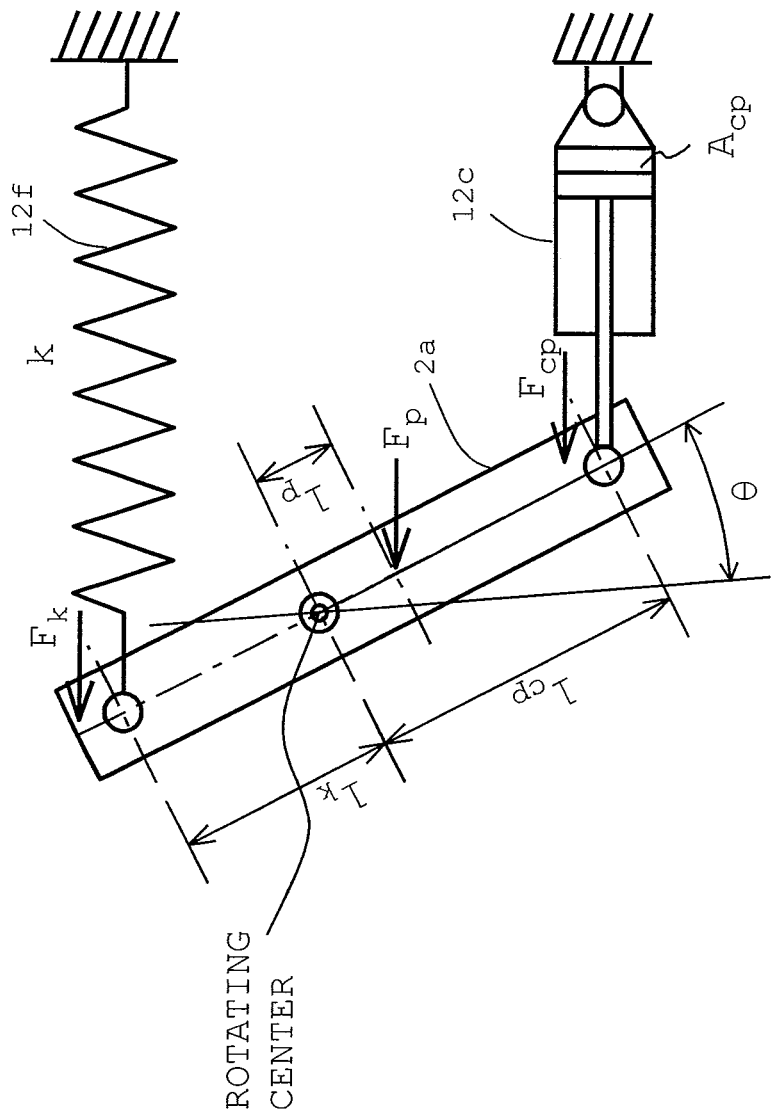
FIG. 3D is a diagram for explaining a typical dynamic model used in the calculation by the estimator and the parameters for use with that model.

FIG. 3D is a diagram for explaining the typical dynamic model used in the calculation by the estimator 64a and the parameters for use with that model.

First, the parameters used with the typical dynamic mode are explained with reference to FIG. 3D. FIG. 3D shows schematically (using the typical dynamic mode) the structure of a swash plate tilting angle adjusting unit for the hydraulic pump 2. The swash plate of the hydraulic pump 2 is indicated by use of a rectangular bar-shaped member 2a.

The parameters for use with the typical dynamic model are as follows:

$A_{CP}$: Pressure-receiving area of the LS control piston 12c $F_{CP}$: Force received by the swash plate 2a from the LS control piston 12c $F_P$: Resultant force received by the swash plate 2a from the pistons of piston cylinders as pump elements (Each of the pistons of the piston cylinders as the pump elements doubles as the torque control piston 12a shown in FIG. 1. The pistons of the piston cylinders are offset from the rotating center of the swash plate 2a. As the delivery pressure of the hydraulic pump 2 is increased, each piston generates force in a direction that reduces the tilting angle of the swash plate 2a.)

$F_K$: Force received by the swash plate 2a from a torque control spring 12f
(The spring 12f sets maximum torque to be consumed by the hydraulic pump 2.)

k: Spring constant of the torque control spring 12f

θ: Titling angle of the swash plate 2a
(As the tilting angle θ is increased, the pump displacement is raised; as the tilting angle θ is decreased, the pump displacement is lowered.)

$L_{CP}$: Distance between the point of action of the force $F_{CP}$ received by the swash plate 2a from the LS control piton 12c on the one hand, and the rotating center of the swash plate 2a on the other hand $L_P$: Distance between the point of action of the resultant force $F_P$ received by the swash plate 2a from each of the pistons (torque control piston 12a) of the piston cylinders on the one hand, and the rotating center of the swash plate 2a on the other hand $L_K$: Distance between the point of action of the force $F_K$ received by the swash plate 2a from the torque control spring 12f on the one hand, and the rotating center of the swash plate 2a on the other hand The parameters involved other than those used in the calculation of FIG. 3A and shown in FIG. 3D are as follows:

ρ: Density of hydraulic operating fluid $C_{PA}$: Coefficient of contraction from pump port P to actuator port A of the LS control valve 12b $C_{AT}$: Coefficient of contraction from actuator port A to tank port T of the LS control valve 12b B: Bulk modulus of hydraulic operating fluid $V_{CP}$: Volume inside the LS control piston 12c 1/s: Integral block $I_{SW}$: Moment of inertia around the rotating center of the swash plate 2a c: Coefficient of viscosity of the swash plate As shown in FIG. 3B, the calculation unit 81 is made up of sub-calculation units 81a through 81f. The calculation unit 81 calculates the pressure inside the LS control piston 12c from the output pressure Pgr of the engine revolution speed detection valve 13 (called the Pgr pressure hereunder), which is detected with the pressure sensor 41, and from the output pressure Pls of the differential pressure reducing valve 11 (called the Pls pressure hereunder), which is detected with the pressure sensor 42, as described below.

<Sub-Calculation Unit 81a>

The sub-calculation unit 81a calculates the pressure difference between the Pgr pressure and the Pls pressure and, by use of the differential pressure, calculates a meter-in opening area APA and a meter-out opening area AAT of the LS control valve 12b. As discussed above, the Pgr pressure and the Pls pressure are led to the opposed pressure receiving portions 12d and 12e of the LS control valve 12b, respectively. The LS control valve 12b performs its stroke in accordance with the pressure difference between the Pgr pressure and the Pls pressure in order to vary a meter-in throttle opening area (meter-in opening area APA) and a meter-out throttle opening area (meter-out opening area AAT). The meter-in throttle is a throttle on a passage that connects the pump port P with the actuator port A of the LS control valve 12b, and the meter-out throttle is a throttle on a passage that connects the actuator port A with the tank port T of the LS control valve 12b. The pump port P is connected to the pilot hydraulic line 31b, the actuator port A is connected to the LS control piston 12c, and the tank port T is connected to the tank T. The vehicle controller 64 stores in advance the relations of the meter-in opening area APA and those of the meter-out opening area AAT with regard to the pressure difference between the Pgr pressure and the Pls pressure. The sub-calculation unit 81a obtains the meter-in opening area APA and the meter-out opening area AAT by referencing the calculated pressure difference value against these relations.

<Sub-Calculation Unit 81b>

The sub-calculation unit 81b calculates the rate of flow into the LS control piston 12c via the meter-in throttle of the LS control valve 12b by use of the meter-in opening area APA calculated with the sub-calculation unit 81a, a previously stored pressure (constant value) of the pilot hydraulic line 31b, and a pressure PCP inside the LS control piston 12c (internal calculated value, to be discussed later). Generally, the flow rate Q passing through a throttle (orifice) is obtained by use of the following expression:

$$Q = C \cdot A \sqrt{(2(\Delta P)/2)} \qquad (1)$$

where,

C: Coefficient of contraction of the throttle

A: Opening area of the throttle

ΔP: Differential pressure across the throttle

ρ: Density of fluid

The sub-calculation unit 81b obtains the differential pressure across the meter-in throttle of the LS control valve 12b by subtracting the pressure PCP inside the LS control piston 12c (internal calculated value) from the pressure (constant value) of the pilot hydraulic line 31b. The sub-calculation unit 81b then applies to the expression (1) above the differential pressure, the meter-in opening area APA calculated with the sub-calculation unit 81a, the density ρ of hydraulic fluid, and the coefficient of contraction $C_{PA}$ of the meter-in throttle, thereby obtaining the flow rate into the LS control valve 12b via the meter-in throttle.

<Sub-Calculation Unit 81c>

On the basis of the same principles as the sub-calculation unit 81b, the sub-calculation unit 81c calculates the rate of flow out of the LS control piston 12c via the meter-out throttle of the LS control valve 12b by use of the meter-out opening area AAT calculated with the sub-calculation unit 81a and the pressure PCP inside the LS control piston 12c (internal calculated value, to be discussed later). If the pressure of the tank T is assumed to be zero, the differential pressure across the meter-out throttle becomes equal to the pressure PCP inside the LS control piston 12c. In this case, too, the differential pressure across the meter-out throttle (pressure PCP inside the LS control piston 12c), the meter-out opening area AAT calculated with the sub-calculation unit 81a, the density ρ of hydraulic operating fluid, and the coefficient of contraction $C_{AT}$ of the meter-out throttle are applied to the expression (1) above, whereby the flow rate out of the LS control valve 12b via the meter-out throttle is obtained.

<Sub-Calculation Unit 81d>

The sub-calculation unit 81d calculates the rate of flow generated by contraction and extension of the LS control piston 12c itself by multiplying an angular velocity of the swash plate (internal calculated value, to be discussed later) by the pressure-receiving area $A_u$ of the LS control piston 12c.

<Sub-Calculation Unit 81e>

The sub-calculation unit 81e calculates a total flow rate by adding up the rates of the flow into and out of the LS control piston 12c calculated with the sub-calculation units 81b, 81c and 81d.

<Sub-Calculation Unit 81f>

The sub-calculation unit 81f multiplies the total flow rate calculated with the sub-calculation unit 81e by the bulk modulus B divided by the internal volume $V_{CP}$ of the LS control piston 12c, before integrating the resulting value to calculate the pressure PCP inside the LS control piston 12c.

As shown in FIG. 3C, the calculation unit 82 is made up of sub-calculation units 82a through 82h. The calculation unit 82 calculates the pump displacement from the pump pressure detected with the pressure sensor 40 and from the pressure inside the LS control piston 12c calculated with the calculation unit 81, as described below.

<Sub-Calculation Unit 82a>

The sub-calculation unit 82a calculates the force Fcp received by the swash plate 2a from the LS control piston 12c by multiplying the pressure PCP inside the LS control piston 12c calculated with the calculation unit 81 by the pressure-receiving area of the LS control piston 12c. The sub-calculation unit 82a further calculates the angular moment of the swash plate 2a under the pressure PCP inside the LS control piston 12c by multiplying the force $F_{CP}$ by the distance $L_{CP}$ between the point of action of the force $F_{CP}$ received by the swash plate 2a from the LS control piston 12c on the one hand, and the rotating center of the swash plate 2a on the other hand.

<Sub-Calculation Unit 82b>

The sub-calculation unit 82b calculates the resultant force (i.e., force received by the swash plate 2a from the torque control piston 12a) $F_P$ received by the swash plate 2a from each of the pistons of the piston cylinders on the basis of the pump pressure. The sub-calculation unit 82b further multiplies the resultant force $F_P$ by the distance $L_P$ between the point of action of the resultant force $F_P$ received by the swash plate 2a on the one hand and the rotating center of the swash plate 2a on the other hand, thereby calculating the angular moment of the swash plate 2a under the pump pressure Pd. The vehicle controller 64 stores in advance the relations between the pump pressure and the resultant force $F_P$ received by the swash plate 2a from each of the pistons of the piston cylinders. The sub-calculation unit 82b obtains the resultant force Fp by referencing the pump pressure against these relations.

<Sub-Calculation Unit 82c>

The sub-calculation unit 82c calculates the force $F_K$ received by the swash plate 2a from the torque control spring 12f by multiplying the tilting angle θ of the swash plate 2a (internal calculated value, to be discussed later) by a spring constant k of the torque control spring 12f. The sub-calculation unit 82c further multiplies the force $F_K$ by the distance $L_K$ between the point of action of the force $F_K$ received by the swash plate 2a on the one hand and the rotating center of the swash plate 2a on the other hand, thereby calculating the angular moment of the swash plate 2a under biasing force of the torque control spring 12f.

<Sub-Calculation Unit 82d>

The sub-calculation unit 82d calculates a total moment by adding up the moments working around the rotating center of the swash plate 2a and calculated with the sub-calculation units 82a, 82b and 82c.

<Sub-Calculation Unit 82e>

The sub-calculation unit 82e calculates the moment of resistance working around the rotating center of the swash plate 2a by multiplying the angular velocity of the swash plate (internal calculated value, to be discussed later) by the coefficient c of viscosity of the swash plate. The sub-calculation unit 82e further subtracts the movement of resistance from the total moment calculated with the sub-calculation unit 82d, thereby calculating the moment working around the rotating center of the swash plate 2a.

<Sub-Calculation unit 82f>

The sub-calculation unit 82f multiplies the moment working around the rotating center of the swash plate 2a and calculated with the sub-calculation unit 82e, by 1 divided by the moment of inertia $I_{SW}$ around the rotating center of the swash plate 2a, before integrating the resulting value to calculate the angular velocity of the swash plate 2a.

<Sub-Calculation Unit 82g>

The sub-calculation unit 82g calculates the tilting angle of the swash plate 2a by integrating the angular velocity of the swash plate 2a calculated with the sub-calculation unit 82f.

<Sub-calculation unit 82h>

The sub-calculation unit 82h calculates the pump displacement from the tilting angle of the swash plate 2a obtained with the sub-calculation unit 82g. The vehicle controller 64 stores in advance the relations between the tilting angle of the swash plate 2a and the pump displacement. The sub-calculation unit 82h obtains the pump displacement by referencing the tilting angle of the swash plate 2a against these relations.

(Basic Operations of the Hydraulic Circuit)

First, the basic operations of the hydraulic circuit in the hydraulic drive system of this embodiment are explained.

When the control levers of all operating devices including the control lever devices 122 and 123 are in neutral position, the flow control valves 6a, 6b, 6c, ... are in neutral position so that the delivery fluid from the hydraulic pump 2 are not supplied to the actuators 3a, 3b, 3c, etc. Also, when the flow control valves 6a, 6b, 6c, ... are in neutral position, the maximum load pressure detected with the shuttle valves 9a, 9b, 9c, ... is the tank pressure. When the delivery pressure of the hydraulic pump 2 becomes higher than the unloading pressure Pun (i.e., pressure obtained by adding up the set pressure of the spring 15a and the output pressure of the engine revolution speed detection valve 13), the unloading valve 15 is opened to provide control so that the delivery pressure of the hydraulic pump 2 does not become higher than the unloading pressure Pun.

On the other hand, when the delivery pressure of the hydraulic pump 2 is increased so that the output pressure of the differential pressure reducing valve 11 becomes higher than the output pressure of the engine revolution speed detection valve 13, the LS control valve 12b is switched to the right side position shown in the figure. This allows the pressure of the pilot hydraulic power source 33 to be led to the LS control piston 12c so that the hydraulic pump 2 is controlled to have its tilting angle reduced. The hydraulic pump 2 has a stopper (not shown) that prescribes the minimum tilting angle of the pump 2. The hydraulic pump 2 is held at the minimum tilting angle as prescribed by the stopper, thus delivering a minimum flow rate.

When any one of the actuators, the boom control lever for example, is operated alone, the flow control valve 6b is switched to supply the hydraulic fluid to the boom cylinder 3b, which drives the boom cylinder 3b.

The flow rate through the flow control valve 6b is determined by the opening area of the meter-in throttle and the differential pressure across the meter-in throttle of the valve 6b. Because the differential pressure across the meter-in throttle is controlled by the pressure compensating valve 7b to become equal to the output pressure of the differential pressure reducing valve 11, the flow rate through the flow control valve 6b (hence the driving speed of the boom cylinder 3b) is controlled in accordance with the operation amount of the control lever (demanded flow rate).

As the boom cylinder 3b starts to operate, the delivery pressure of the hydraulic pump 2 drops temporarily. However, the output pressure of the engine revolution detection valve 13 and that of the differential pressure reducing valve 11 are led to the LS control valve 12b of the hydraulic pump 2, so that if the delivery pressure of the hydraulic pump 2 drops to let the output pressure of the differential pressure reducing valve 11 become lower than the output pressure of the engine revolution speed detection valve 13, the LS control valve 12b is switched to the left side position shown in the figure. This provides control so that the LS control piston 12c is connected with the tank T to increase the tilting angle of the hydraulic pump 2, thereby raising the delivery flow rate of the hydraulic pump 2. The rise in the delivery flow rate of the hydraulic pump 2 continues until the output pressure of the differential pressure reducing valve 11 becomes equal to the output pressure of the engine revolution speed detection valve 13. The above series of operations provides control so that the delivery pressure of the hydraulic pump 2 becomes higher than the maximum load pressure just by the output pressure (target differential pressure) of the engine revolution speed detection valve 13. In this manner, the boom cylinder 3b is supplied with the flow rate (demanded flow rate) corresponding to the operation amount of the control lever under so-called load sensing control.

When the boom cylinder 3b is driven, the load pressure of the boom cylinder 3b is led as the maximum load pressure to the unloading valve 15 so that the cracking pressure of the unloading valve 15 (i.e., pressure at which the unloading valve 15 starts to open) is raised in keeping with the load pressure of the boom cylinder 3b. This allows the delivery fluid of the hydraulic pump 2 to be supplied to the boom cylinder 3b without the unloading valve 15 getting opened. And when the delivery pressure of the hydraulic pump 2 becomes transiently higher than the maximum load pressure and higher than the unloading pressure Pun (i.e., pressure obtained by adding up the set pressure of the spring 15a and the output pressure of the engine revolution speed detection valve 13), the unloading valve 15 is opened to let the delivery fluid of the hydraulic pump 2 partially return to the tank, whereby the transient rise in the delivery pressure of the hydraulic pump 2 is prevented.

Where the control levers of two or more actuators, the boom control lever and the arm control lever for example, are operated in combination, load sensing control is performed so that the delivery pressure of the hydraulic pump 2 becomes higher than the maximum load pressure just by the output pressure of the engine revolution speed detection valve 13 (target differential pressure) as in the case of a single control lever being operated. The boom cylinder 3b and the arm cylinder 3c are supplied with the flow rates reflecting the operation amounts of the control levers (demanded flow rates), whereby the boom cylinder 3b and the arm cylinder 3c are driven.

Also, the differential pressure across each of the meter-in throttles of the flow control valves 6b and 6c is controlled by the pressure compensating valves 7b and 7c to become equal to the output pressure of the differential pressure reducing valve 11 (i.e., differential pressure between the delivery pressure of the hydraulic pump 2 and the maximum load pressure). For this reason, regardless of the magnitude of their load pressures, the boom cylinder 3b and arm cylinder 11 are supplied with hydraulic fluid in proportion to the opening area of each of the meter-in throttles of the flow control valves 6b and 6c.

At this point, if a saturation state is reached in which the delivery flow rate of the hydraulic pump 2 fails to meet the flow rate demanded by the control levers, the output pressure of the differential pressure reducing valve 11 (differential pressure between the delivery pressure of the hydraulic pump 2 and the maximum load pressure) drops in keeping with the degree of saturation, and the target compensation differential pressure of the pressure compensating valves 7b and 7c is reduced accordingly. Thus the delivery flow rate of the hydraulic pump 2 can be redistributed in proportion to the opening area of each of the meter-in throttles of the flow control valves 6b and 6c.

The above-described operations take place when the engine 1 is at the rated maximum revolution speed. If the revolution speed of the engine 1 is reduced to low speed, the output pressure of the engine revolution speed detection valve 13 is lowered accordingly, which causes the target differential pressure of the LS control valve 12b to drop likewise. And as a result of load sensing control, the target compensation differential pressures of the pressure compensating valves 7a, 7b, 7c, . . . drop likewise. In this manner, the delivery flow rate of the hydraulic pump 2 and the flow rate through the flow control valves 6a, 6b, 6c, are reduced in keeping with the drop of the engine revolution speed, whereby fine operability available when the engine revolution speed is lowered can be improved with the driving speeds of the actuators 3a, 3b, 3c, . . . kept from getting exceedingly high.

(Operations Regarding the Motor-Generator 60)

Explained next are the operations regarding the motor-generator 60 characteristic of the hydraulic drive system of this embodiment.

As discussed above, when the control lever or levers of any actuators are operated singly or in combination, the corresponding flow control valve or valves are switched and load sensing control is performed at the same time to increase the delivery flow rate of the hydraulic pump 2, whereby the relevant actuators are supplied with the flow rates reflecting the operation amounts of the control levers involved. At this point, the vehicle controller 64 performs the processes described below to switch the motor-generator 60 either to motor function or to generator function.

First, the delivery pressure of the hydraulic pump 2, which is detected with the pressure sensor 40, the output pressure Pgr of the engine revolution speed detection valve 13, which is detected with the pressure sensor 41, and the output pressure Pls of the differential pressure reducing valve 11, which is detected with the pressure sensor 42, are input to the estimator 64a. The estimator 64a calculates virtually the displacement of the hydraulic pump 2 in accordance with the principles explained above by use of FIGS. 3A through 3D. Also, the output pressure Pgr of the engine revolution speed detection valve 13, which is detected with the pressure sensor 41, is input to the revolution speed table data 64b. In turn, the revolution speed table data 64b calculates the pump revolution speed. The pump displacement and the pump revolution speed thus calculated are subjected to multiplication by the multiplier 64c whereby the delivery flow rate of the hydraulic pump 2 is calculated. The delivery pressure of the hydraulic pump 2, which is detected with the pressure sensor 40, and the pump flow rate calculated above are subjected to multiplication by the multiplier 64d whereby the power need of the hydraulic pump 2 (pump power need) is calculated.

Meanwhile, the pump revolution speed calculated with the revolution speed table data 64b is input to the output table data 64f whereby the output of the engine 1 (engine output) is calculated. At this point, if the revolution speed of the hydraulic pump 2 is different from the revolution speed of the engine 1 due to the speed reduction ratio of the power distributor 70, the difference between the revolution speeds is compensated with the converter 64e.

(Effect)

The subtractor 64g performs a comparison between the engine output and the pump power need calculated as described above. Later, if the comparison reveals that "engine output" minus "pump power need" minus Pm is equal to or larger than ($\geq$) zero, this means that there is engine output to spare. In this case, the computing unit 64h outputs the control signal to the converter 61 so that the motor-generator 60 is to be used as a generator. The motor-generator 60 thus caused to run as the generator generates power that is stored into the battery 62. Conversely, if the comparison reveals that "engine output" minus "pump power need" minus Pm is less than (<) zero, this means that there is no engine output to spare regarding the pump power need. In this case, the computing unit 64h outputs the control signal to the converter 61 so that the motor-generator 60 is to be used as a motor. The motor-generator 60 thus caused to run as the motor operates by use of power from the battery 62 to assist the engine 1.

According to this embodiment described above, excess engine output is accumulated as electric energy so as to save energy. When engine output becomes insufficient, the stored electric energy is discharged to drive the motor-generator 60, whereby the necessary pump power is maintained. As a result, it is possible to adopt a small-size engine that has rated output commensurate with the average horsepower required by the working machine to perform its work. This boosts fuel efficiency and reduces $CO_2$ emissions.

Also according to this embodiment, the displacement of the hydraulic pump 2 can be estimated without resorting to sensors to detect the titling angle of the swash plate of the hydraulic pump 2. There is no need to install tilting angle sensors. As a result, the hybrid system can be mounted easily on small-size hydraulic excavators such as mini-excavators having often-insufficient installation space.

Also according to this embodiment, the pump revolution speed or the engine revolution speed is calculated from the output pressure Pgr of the engine revolution speed detection valve 13, which is detected with the pressure sensor 41. Thus the power need of the hydraulic pump 2 can be calculated without the use of sensors to detect the tilting angle of the swash plate 2a of the hydraulic pump 2 and the revolution speed of the engine 1. As a result, the hybrid system can be mounted easily on small-size hydraulic excavators such as mini-excavators with their engines not equipped with sensors to detect the revolution speed because of size restrictions.

Other Embodiments

The embodiment discussed above may be varied in many ways within the spirit and scope of the present invention. Some of these variations are explained below.

Figure 5:
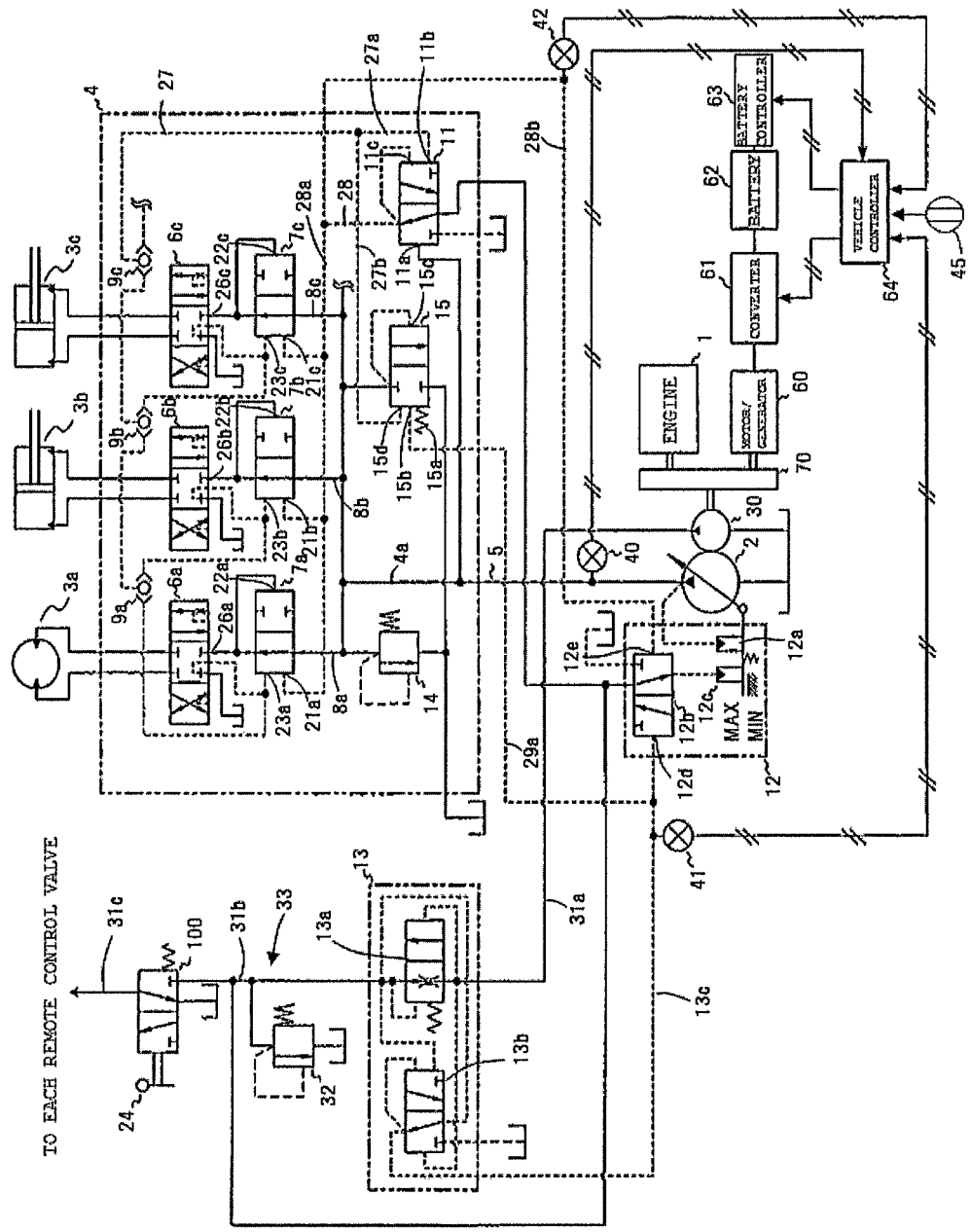
FIG. 5 is a diagram showing a configuration of a hydraulic drive system (hybrid system) of a hybrid working machine as another embodiment of the present invention.

(1) With the above-described embodiment, the pressure sensor 41 is used to detect the output pressure Pgr of the engine revolution speed detection valve 13 in calculating the actual revolution speed of the engine 1. The calculated actual revolution speed of the engine 1 is then used to calculate the pump flow rate and the engine output. Alternatively, a target revolution speed may be used in place of the actual revolution speed of the engine 1 to calculate the pump flow rate and the engine output. On working machines like hydraulic excavators, the target revolution speed of the engine 1 is generally designated by the operator manipulating operation means such as an engine control dial 45 installed in the cabin as shown in FIG. 5. A signal designating the target revolution speed is input to an engine controller. Thus where it is desired to use a target revolution speed in calculating the pump flow rate and the engine output, the designation signal of the engine control dial need only be input so that the target revolution speed may be calculated from that designation signal.

(2) With the above-described embodiment, the differential pressure reducing valve 11 is provided to output the differential pressure between the delivery pressure of the hydraulic pump 2 and the maximum load pressure as an absolute pressure that is detected by use of the pressure sensor 42. However, some types of working machines are not equipped with the differential pressure reducing valve 11. In such cases, a pressure sensor may be provided to detect the maximum load pressure. A controller may then calculate the differential pressure between the maximum load pressure detected with the pressure sensor on the one hand and the pump pressure detected with the pressure sensor 40 on the other hand, the calculated differential pressure being used in place of the output pressure of the differential pressure reducing valve 11. Where the differential pressure reducing valve 11 is not to be provided, the 7a, 7b, 7c, . . . may be equipped with two opposed pressure receiving portions in place of the pressure receiving portions 21a, 21b, 21c, . . . which open when operated. The pump pressure and the maximum load pressure may then be led separately to these two pressure receiving portions. Likewise, the LS control valve 12b may be furnished with two opposed pressure receiving portions to which the pump pressure and the maximum load pressure may be led separately.

(3) With the above embodiment, the description has focused on the construction machines that are small-size hydraulic excavators. Alternatively, the present invention may be applied to working machines other than the hydraulic excavators as long as the machines are small-sized (wheel type excavators, for example), and the similar effects will still be obtained.

DESCRIPTION OF REFERENCE CHARACTERS

1 Engine
2 Hydraulic pump (main pump)
3a, 3b, 3c, . . . Actuator
4 Control valve
4a Second hydraulic fluid supply line
5 First hydraulic fluid supply line
6a, 6b, 6c, . . . Flow control valve
7a, 7b, 7c, . . . Pressure compensating valve
8a, 8b, 8c, . . . Hydraulic line
9a, 9b, 9c, Shuttle valve
11 Differential pressure reducing valve
12 Pump control system
12a Torque control piston
12b LS control valve
12c LS control piston
13 Engine revolution speed detection valve
14 Main relief valve
15 Unloading valve
24 Gate lock lever
27, 27a, 27b Signal hydraulic line
30 Pilot pump
31a Hydraulic fluid supply line
31b Pilot hydraulic line
31c Pilot hydraulic line
32 Pilot relief valve
33 Pilot hydraulic power source
40 Pressure sensor (first pressure sensor)
41 Pressure sensor (third pressure sensor)
42 Pressure sensor (second pressure sensor)
60 Motor-generator
61 Converter
62 Battery
63 Battery controller
64 Vehicle controller
64a Estimator (observer)
64b Revolution speed table data
64c, d Multiplier
64e Converter
64f Engine output table data
64g Subtractor
64h Computing unit
64j Pump power calculation unit
70 Power distributor
81 Calculation unit
81a to 81f Sub-calculation unit
82 Calculation unit
82a to 82f Sub-calculation unit
100 Gate lock valve
122, 123 Control lever device

The invention claimed is:
1. A hybrid working machine comprising:
an engine;
a hydraulic pump driven by the engine;
a motor which drives the hydraulic pump in combination with the engine;
a plurality of actuators driven by hydraulic fluid delivered by the hydraulic pump;
a pilot pump driven by the engine;

a pilot hydraulic power source connected to the pilot pump to generate a pilot primary pressure based on delivery fluid from the pilot pump;

an engine revolution speed detection valve interposed between the pilot pump and the pilot hydraulic power source, the engine revolution speed detection valve further generating a hydraulic signal as an absolute pressure dependent on an engine revolution speed of the engine based on the delivery fluid from the pilot pump, and outputting the hydraulic signal;

a maximum load pressure detection circuit which detects a maximum load pressure of the plurality of actuators;

a plurality of flow control valves which control respective flow rates and directions of hydraulic fluid supplied from the hydraulic pump to the plurality of actuators;

a plurality of pressure compensating valves which control respective differential pressures across the plurality of flow control valves to be equal to a differential pressure between a delivery pressure of the hydraulic fluid supplied from the hydraulic pump and the maximum load pressure; and a pump control system including a torque control unit which performs control to reduce a displacement of the hydraulic pump when the delivery pressure of the hydraulic pump is being raised, so that an absorption torque of the hydraulic pump will not exceed a predetermined maximum torque, and a load sensing control unit which controls the displacement of the hydraulic pump in such a manner that the delivery pressure of the hydraulic pump becomes higher than the maximum load pressure by a target differential pressure, wherein the hydraulic signal output from the engine revolution speed detection valve is received by the load sensing control unit as the target differential pressure for load sensing control, and the load sensing control unit includes a load sensing control piston that controls the displacement of the hydraulic pump by driving a displacement volume varying member of the hydraulic pump based on a pilot primary pressure of the pilot hydraulic power source;

a plurality of pressure sensors including a first pressure sensor which detects the delivery pressure of the hydraulic pump, second pressure sensor which detects the differential pressure between the delivery pressure of the hydraulic pump and the maximum load pressure, and a third pressure sensor which detects the hydraulic signal output from the engine revolution speed detection valve, and a control system configured to receive the detected pressures from the first, second, and third pressure sensors, and control the motor;

wherein the control system is further configured to:

store a predetermined constant pressure of the pilot hydraulic power source, calculate the displacement of the hydraulic pump based on the detected pressures from the first, second, and third pressure sensors, the constant pressure of the pilot hydraulic power source, and an equation of motion about the displacement volume varying member of the hydraulic pump, calculate the engine revolution speed based on the hydraulic signal detected with the third pressure sensor, calculate a power need of the hydraulic pump based on the engine revolution speed, the calculated displacement of the hydraulic pump, and the delivery pressure of the hydraulic pump detected with the first pressure sensor, calculate an output power of the engine based on the engine revolution speed, and switch between powering control and generation control of the motor in accordance with a result of comparing the power need of the hydraulic pump and the output power of the engine.

2. The hybrid working machine according to claim 1, further comprising:

a differential pressure reducing valve which generates the differential pressure, as an absolute pressure, between the delivery pressure of the hydraulic pump and the maximum load pressure, and outputs the differential pressure, wherein the second pressure sensor detects the differential pressure output from the differential pressure reducing valve.

3. A hybrid working machine comprising:

an engine;

a hydraulic pump driven by the engine;

a motor which drives the hydraulic pump in combination with the engine;

a plurality of actuators driven by hydraulic fluid delivered by the hydraulic pump;

a pilot pump driven by the engine;

a pilot hydraulic power source connected to the pilot pump to generate a pilot primary pressure based on delivery fluid from the pilot pump;

an engine revolution speed detection valve interposed between the pilot pump and the pilot hydraulic power source, the engine revolution speed detection valve further generating a hydraulic signal as an absolute pressure dependent on an engine revolution speed based on the delivery fluid from the pilot pump, and outputting the hydraulic signal;

a maximum load pressure detection circuit which detects a maximum load pressure of the plurality of actuators;

a plurality of flow control valves which control respective flow rates and directions of the hydraulic fluid supplied from the hydraulic pump to the plurality of actuators;

a plurality of pressure compensating valves which control respective differential pressure across the plurality of flow control valves to be equal to a differential pressure between a delivery pressure of the hydraulic pump and the maximum load pressure; and a pump control system including a torque control unit which performs control to reduce a displacement of the hydraulic pump when the delivery pressure of the hydraulic pump is being raised, so that an absorption torque of the hydraulic pump will not exceed a predetermined maximum torque, and a load sensing control unit which controls the displacement of the hydraulic pump in such a manner that the delivery pressure of the hydraulic pump becomes higher than the maximum load pressure by a target differential pressure, wherein the hydraulic signal from the engine revolution speed detection valve is received by the load sensing control unit as the target differential pressure for load sensing control, and the load sensing control unit includes a load sensing control piston that controls the displacement of the hydraulic pump by driving a displacement volume varying member of the hydraulic pump based on a pilot primary pressure of the pilot hydraulic power source;

an engine control dial which indicates a target revolution speed of the engine;

a plurality of pressure sensors including a first pressure sensor which detects the delivery pressure of the hydraulic pump, a second pressure sensor which detects the differential pressure between the delivery pressure of the hydraulic pump and the maximum load pressure, and a third pressure sensor which detects the hydraulic signal output from the engine revolution speed detection valve; and a control system configured to receive the detected pressures from the first, second, and third pressure sensors and the target revolution speed of the engine indicated by the engine control dial, and control the motor;

wherein the control system is further configured to:

store a predetermined constant pressure of the pilot hydraulic power source, calculate the displacement of the hydraulic pump based on the detected pressures from the first, the second, and the third pressure sensors, the constant pressure of the pilot hydraulic power source, and an equation of motion about the displacement volume varying member of the hydraulic pump, calculate the engine revolution speed based on the target revolution speed of the engine indicated by the engine control dial, calculate a power need of the hydraulic pump based on the engine revolution speed, the calculated displacement of the hydraulic pump, and the delivery pressure of the hydraulic pump detected with the first pressure sensor, calculate an output power of the engine based on the engine revolution speed, and switch between powering control and generation control of the motor in accordance with a result of comparing the power need of the hydraulic pump and the output power of the engine.

\* \* \* \* \*